C. T. ALLCUTT.
SYSTEM OF FIELD EXCITATION FOR DYNAMO ELECTRIC MACHINES.
APPLICATION FILED MAR. 13, 1918.
1,334,942.
Patented Mar. 30, 1920.
2 SHEETS—SHEET 1.
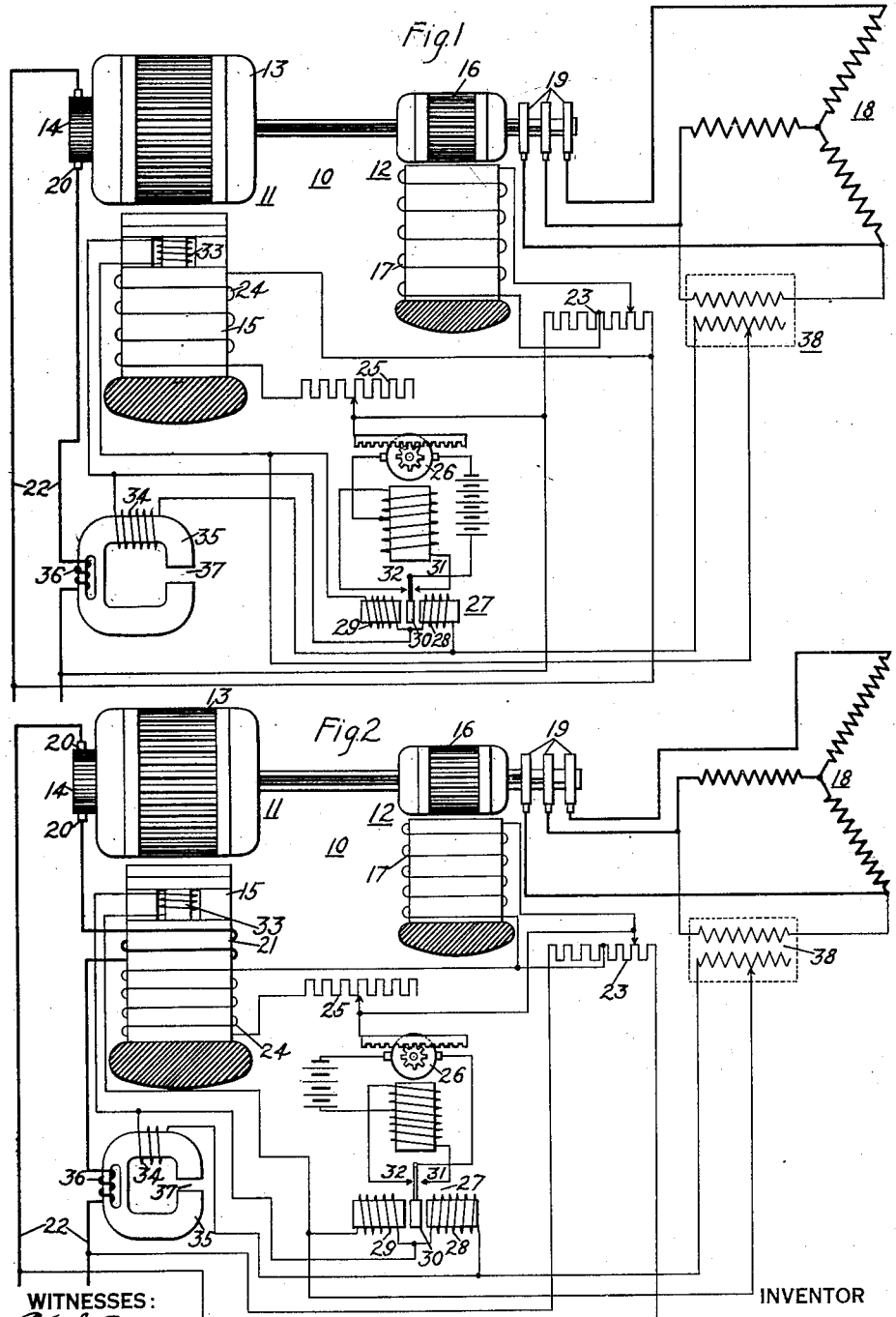
WITNESSES:
W. S. Reece
INVENTOR
Chester T. Allcutt
BY
ATTORNEY

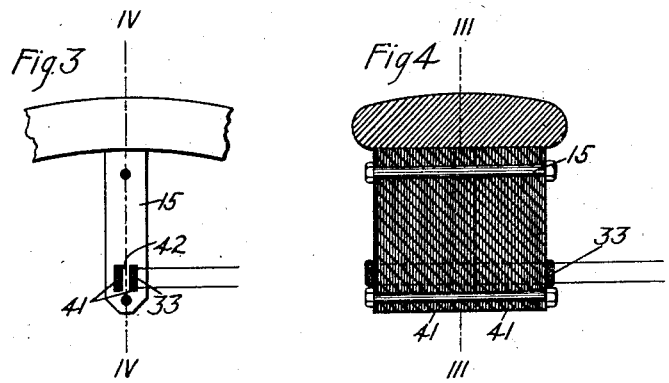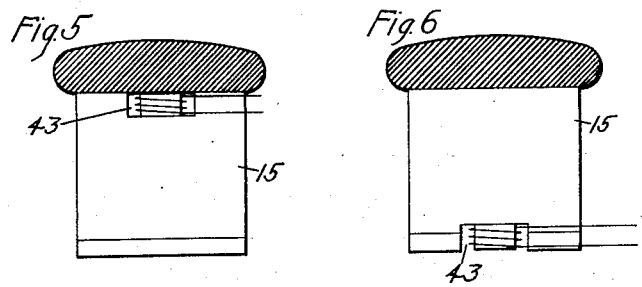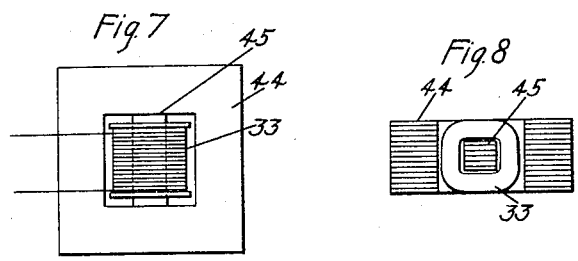

UNITED STATES PATENT OFFICE.

CHESTER T. ALLCUTT, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF FIELD EXCITATION FOR DYNAMO-ELECTRIC MACHINES.

1,334,942.  Specification of Letters Patent.  Patented Mar. 30, 1920.

Application filed March 13, 1918. Serial No. 222,070.

*To all whom it may concern:*

Be it known that I, CHESTER T. ALLCUTT, a citizen of the United States, and a resident of Wilkinsburg, in the county of Allegheny and State of Pennsylvania, have invented a new and useful Improvement in Systems of Field Excitation for Dynamo-Electric Machines, of which the following is a specification.

My invention relates to systems of regulation, and it has for its object to provide a system whereby a unidirectional magnetic field may be regulated in strength in accordance with the current flow or magnetic strength of an independent and variable electric or magnetic circuit. More specifically, my invention relates to systems whereby the flux under the interpole of a dynamo-electric machine may be regulated in accordance with the load current of said machine.

In the accompanying drawing, Figure 1 is a diagrammatic view of a synchronous booster rotary converter, together with auxiliary apparatus, embodying a preferred form of my invention; Fig. 2 is a diagrammatic view of a modification of the system shown in Fig. 1; Figs. 3 and 4 are end and side views, respectively, of an interpole employed in carrying out my invention; Figs. 5 and 6 are side views of modifications of the interpole shown in Fig. 4; and Figs. 7 and 8 are plan and sectional views, respectively, of a pilot device adapted to be employed in conjunction with any of the interpoles shown.

It is frequently desirable to regulate a unidirectional magnetic field in accordance with some variable force but considerable difficulty has been experienced in obtaining a device which would function in accordance with the strength of the unidirectional magnetic field, so as to serve as one controlling element in an automatic regulator.

In a copending application of D. C. Davis, Serial No. 216,089, filed Feb. 8, 1918, and assigned to the Westinghouse Electric & Manufacturing Company there is described and claimed a system of the character designated wherein a small pilot armature is operated at constant speed, in the field to be controlled so as to develop an electromotive force proportional to the strength of the unidirectional magnetic field.

While the system thus described operates satisfactorily from an electrical view-point, it is subject to disadvantages from a mechanical view-point because of difficulties incident to properly mounting and driving the auxiliary pilot armature.

In accordance with the present invention, I place a small pilot device, comprising a coil and a magnetizable core, in the unidirectional field to be regulated and a similar pilot device in a unidirectional magnetic field developed by the controlling or regulating force such, for example, as a load current. I then supply alternating current to the coils of the said two pilot devices, the flow of alternating current to each coil being determined by the admittance thereof and said admittance, in turn, being determined by the degree of saturation of the core of said pilot device by the unidirectional magnetic flux flowing therethrough.

I further provide a differential relay device comprising two torque elements, one of which is subject to the alternating current of each pilot coil, respectively, and I so arrange said relay device that it occupies a neutral position when the magnetic field to be controlled has the desired strength relative to the corresponding load current or other controlling force. If the controlling force be changed, the admittance of the corresponding pilot coil is also changed and the differential relay is unbalanced and serves to adjust the excitation for the field to be controlled so as to again restore the desired ratio.

Thus, the desired control of the unidirectional field strength in accordance, for example, with the load current of a dynamo-electric machine, is automatically effected with no continuously moving parts and through the use of a differential relay which is simple in construction and effective in operation.

Referring to Fig. 1 for a more detailed understanding of my invention, I show a synchronous booster rotary converter at 10, said machine embodying a converter proper at 11 and a booster machine at 12. The converter 11 comprises an armature 13 provided with a commutator 14 and further comprises an interpole field winding 15. Said machine is provided with the usual field frame and exciting field windings but said parts are omitted for clearness and simplicity, as they bear no direct relation to the present invention. The booster machine 12 comprises an armature 16 and an exciting field winding 17.

Energy for operating the converter is supplied from a suitable source 18 through slip rings 19, traverses the windings of the armatures 16 and 13, is taken from the commutator 14 by suitable brushes 20 and is supplied to suitable direct-current mains 22—22.

The excitation of the booster-field winding 17 may be adjusted and reversed by a reversing rheostat 23 deriving energy from any constant-potential source such, for example, as the mains 22. By the adjustment of the rheostat 23, the degree of boost or buck of the machine 12 may be adjusted to vary the output voltage of the converter 11, in a manner well understood in the art.

The interpole 15 is excited by a winding 24 and said winding is connected to be energized from the mains 22. A resistor 25 is inserted in circuit with the field winding 24 and is subject to adjustment by a motor 26 which, in turn, is under the control of a differential-relay device 27 comprising operating coils 28 and 29 mounted to act upon an armature member 30. Said armature member, when moved to the right, makes contact with a fixed contact member 31 and, similarly, when moved to the left, makes contact with a fixed contact member 32, serving to energize the motor 26 for rotation in the one or the other direction. A small pilot coil 33 is mounted near the tip of the interpole 15 and is connected in parallel with the winding 29. A similar pilot coil 34 is mounted upon a core member 35, said core member further carrying a series winding 36 inserted in the load circuit. The core member 35 is arranged to have substantially the same magnetic properties as the magnetic circuit of the interpole 15, as by being provided with an air-gap at 37. The pilot coil 34 is mounted in parallel relation to the coil 28. Connection is made from a small auxiliary transformer 38, energized from the alternating supply mains, to the differential-relay device and pilot coils thus described in such manner as to cause alternating current to flow through the coils 28 and 34 and through the coils 29 and 33 in parallel relation, respectively.

Before proceeding with a description of the operation thus described, it is advisable to briefly digress and to discuss the commutating conditions in the booster rotary converter. In the operation of machines of this character, as in other types of commutating electric machinery, it is essential that the flux under the interpole vary in substantial accordance with the load in order to effectively reverse the current in the armature coil undergoing commutation. The function of the interpole is two-fold.

First, to neutralize the armature reaction and, second, to establish the commutating field for current reversal.

In the synchronous booster rotary converter, the armature reaction is a more or less complicated function. Disregarding the effect of the booster machine, the average reaction in the armature is a motor reaction, as the alternating - current input must necessarily exceed the direct-current output by the electrical and mechanical losses. Investigation has shown, however, that the reaction in the commutating zone is a generator or direct-current reaction.

During boosting operation, the booster machine acts as a generator, deriving motor torque from the converter armature and enhancing the motor reaction therein. There results, therefore, a closer approximation of the motor reaction to the generator reaction in the commutating zone and a consequent weakening of the net armature reaction under the brush.

In like manner, during bucking operation, the booster machine operates as a motor, driving the converter armature as a generator and thus increasing the generator reaction therein, producing an increase in the net armature reaction under the brush.

In the past, it has been proposed to obtain the desired, load-adjusted, reversing field under the interpole by duplicating, in so far as possible, the magnetizing forces of the armature in the magnetizing forces of the interpole, so that the reversing field under the interpole, which is a simple function of the load current, was obtained as the difference between two relatively complicated functions, namely, the armature reaction and the similarly adjusted interpole excitation.

In accordance with the present invention, the necessity for duplicating the effects of the complicated reaction in the excitation of the interpole is done away with. Control is effected with reference to the actual interpole flux and, as this is a simple function, the control means is correspondingly more simple.

Having thus described the arrangement of a system embodying my invention and certain of the theoretical features of the machine employed in said system, the operation is as follows. Let it be assumed that the booster converter 10 is in operation and that the interpole field winding 24 is underexcited, so that the magnetomotive force thereof is substantially equal and opposite to the magnetomotive force of armature reaction. Under these conditions, there is substantially no flux under the interpole and the iron within the pilot coil 33 is, therefore, far from saturation and the pilot coil 33 has relatively high reactance, forcing a relatively large amount of alternating current through the winding 29. The winding 36, however, is strongly energized by load current and tends to produce a strong magnetic flux in the core member 35, lowering the reactance of the pilot coil 34 and shunting a considerable portion of the alternating-current flow from the winding 28.

The armature member 30 is drawn to the left by the preponderance in the energization of the coil 29 over that in the coil 28, and contact is made at the contact member 32, energizing the motor 26 to eliminate a portion of the resistor 25 and thus increase the excitation of the field winding 24. When the magnetomotive force of said interpole field winding sufficiently preponderates over the magnetomotive force of armature reaction to produce the desired reversing field under the interpole, the iron within the pilot coil 33 has been sufficiently saturated to lower the reactance of said coil and partially deënergize the winding 29, whereupon the device 27 reassumes the neutral position and the motor 26 is stopped.

If, at the outset, the setting of the resistor 25 had been such that the field winding 24 was too strongly energized, the reverse action would have taken place. The reversing flux under the interpole would have been too strong, causing the reactance of the pilot coil 33 to be less than that of the pilot coil 34, shunting more current out of the winding 29 than out of the winding 28 and closing circuit with the contact member 31 to operate the motor 26 in the other direction, thus increasing the effective portion of the rheostat 25 and decreasing the energization of the field winding 24 to the desired amount.

Let it now be assumed that the converter is operating with proper interpole excitation and that the load on the converter increases, demanding an increase in the reversing flux under the interpole. The magnetization of the core member 35 is increased because of the increased energization of the coil 36 and thus the reactance of the coil 34 to alternating current is reduced, shunting more current out of the coil 28 and permitting the coil 29 to draw the armature 30 to the left, eliminating resistance from the resistor 25 and increasing the energization of the field winding 24 to the proper amount. The converse action takes place upon a load decrease.

It will be noted that, if the field winding 24 were unexcited at any time, the magnetomotive force of armature reaction would produce flux under the interpole in the reverse direction to that desired, and said flux, traversing the pilot coil 33, would tend to cause regulation of the system in exactly the wrong direction. It is desirable, therefore, that the rheostat 25 be so adjusted, at the outset, as to insure, at all times, that the interpole magnetomotive force shall preponderate over the magnetomotive force of armature reaction. This difficulty may be obviated by the system of Fig. 2, hereinafter described.

In the system of Fig. 1, it will be noted that the entire regulation of the interpole strength is placed upon the auxiliary control mechanism, necessitating that this mechanism be large and expensive. In a copending application of John L. McK. Yardley, Serial No. 757,359, filed Mar. 28, 1913 and assigned to the Westinghouse Electric & Manufacturing Company, it is pointed out that, if the interpole of a booster rotary converter be provided with a series-field winding designed to provide the proper excitation under conditions of zero buck or boost, an auxiliary interpole field winding may be connected to be energized in accordance with the energization of the booster field winding, both in magnitude and direction and, in this way, a fairly close approximation to the desired resultant interpole excitation may be obtained. There are two sources of inaccuracy, however, in the Yardley system thus described. In the first place, the energization of the auxiliary interpole field winding should vary, not only in accordance with the adjustment of the booster field winding but also in accordance with the load current on the converter. Furthermore, the setting of the booster field rheostat or the excitation of the booster field winding is not a true measure of the booster activity when the knee on the magnetization curve of the booster machine is approached, as the booster voltage is not strictly proportional to the field excitation.

By my invention, I am enabled to eliminate the effects of said sources of inaccuracy and to so modify the excitation of an auxiliary interpole field winding as to obtain proper control of the interpole magnetomotive force, employing a far smaller and less expensive mechanism than is necessitated in the system of Fig. 1.

Referring to Fig. 2, the major elements of the system are shown in Fig. 1. The interpole 15, however, is provided with a series-type field winding 21 designed to provide proper interpole excitation under conditions of zero buck or boost. The auxiliary interpole field winding 24 is connected in parallel with the booster field winding 17 and is thus adjusted and reversed in consonance with the adjustment of said booster field winding, so that the resultant excitation of the interpole 15 is fairly close to the desired amount. When boosting, the increased motor reaction of the converter armature more nearly neutralizes the generator reaction in the commutating zone, reducing the net armature reaction and demanding a relatively weak interpolar excitation. Thus, in boosting, the field winding 24 opposes the field winding 21 and the desired weakening of the interpole magnetomotive force is obtained. Conversely, during bucking operation, the net armature reaction is increased and the field winding 24 is connected to aid the field winding 21.

It has previously been pointed out that the energization of the field winding 24 should vary with the load as well as with the booster voltage and this effect is produced by my auxiliary control mechanism. Assume boosting operation, with proper interpole excitation, and let the load increase, demanding an increase in the excitation of the field winding 24. The magnetization of the core 35 is increased, lowering the reactance of the pilot coil 34 and shunting more current from the coil 28. Simultaneously, the increase in the armature magnetomotive force reduces the preponderance of strength of the interpole magnetomotive force and weakens the interpole flux, increasing the reactance of the pilot coil 33 and forcing more current through the coil 29. Thus the armature 30 is drawn to the left, making contact with the member 32 and operating the motor 26 to reduce the resistance of the resistor 25 and to increase the energization of the field winding 24, as desired. A converse action takes place with a load decrease and a similar action may be obtained during bucking operation, the desired reversal having been secured at the rheostat 23.

Turning now to the actual construction of the interpole, attention is directed to Figs. 3 and 4 showing, respectively, end and side views of the interpole 15. Near the central portion of the interpole, openings 41—41 are provided entirely through the body thereof providing a leg member 42 upon which the pilot coil 33 may be mounted. If desired, an interpole may be provided, as shown in Fig. 5, having an opening for the reception of the pilot coil at 43 near the yoke member or said opening may be disposed in the tip of the interpole, as indicated in Fig. 6. The form of pilot device preferably employed in the openings 43 of Figs. 5 and 6 is shown in Figs. 7 and 8 and comprises a closed laminated core member 44 having an internal transverse leg member 45 and a pilot coil 33 mounted thereon.

While I have shown my invention in certain of its present forms, it will be obvious to those skilled in the art that it is not so limited but is susceptible of various minor changes and modifications without departing from the spirit thereof and I desire, therefore, that only such limitations shall be placed thereupon as are imposed by the prior art or are indicated in the appended claims.

I claim as my invention:

1. Means for regulating the strength of a subordinate unidirectional magnetic field in accordance with changes in the strength of a predominant unidirectional magnetic field subject to variation, said means comprising a coil provided with a magnetizable core member disposed in each of said magnetic fields, respectively, means for supplying alternating current to said coils, means actuated by the differential combination of the energy of the two flows of alternating current determined by the respective admittances of said two coils and arranged to occupy a neutral position when said magnetic fields maintain the desired intensity ratio, and means operated by said differential means, upon a departure from said desired ratio, to adjust the excitation of said subordinate magnetic field to restore said desired ratio.

2. Means for regulating the strength of a unidirectional magnetic field in accordance with changes in the current flow in a unidirectional-current circuit subject to current variation comprising means for producing a controlling magnetic field substantially proportional to said unidirectional current flow, a coil provided with a magnetizable core member disposed in each of said magnetic fields, respectively, means for supplying alternating current to said coils, means actuated by the differential combination of the energy of the two flows of alternating current determined by the respective admittances of said two coils and arranged to occupy a neutral position when said magnetic fields maintain the desired intensity ratio, and means operated by said differential means, upon a departure from said desired ratio, to adjust the excitation of said controlled magnetic field to restore said desired ratio.

3. The combination with a dynamo-electric machine provided with a commutating pole, of means for regulating the air-gap flux under said interpole in accordance with the load current of said dynamo-electric machine comprising a pilot coil having a magnetizable core member arranged to be subject to said air-gap flux, means for producing a magnetic field proportional to said load current, an additional pilot coil provided with a magnetizable core and disposed to be subject to said load field, means for supplying alternating current to said pilot coils, means for differentially combining the energy of the flows of alternating current determined by the respective admittances of said two pilot coils, said differential means being arranged to occupy a neutral position when said air-gap flux is of the desired strength for the corresponding load current and means operable by said differential means to adjust the excitation of said commutating pole to produce the desired air-gap flux upon a change in the load current.

4. The combination with a dynamo-electric machine provided with a commutating pole, of means for regulating the air-gap flux under said interpole in accordance with the load current of said dynamo-electric machine comprising a pilot coil having a magnetizable core member arranged to be subject to said air-gap flux, a core member provided with a series-type winding energized in accordance with the load current of said dynamo-electric machine, an additional pilot coil provided with a magnetizable core and disposed to be subject to the load field produced by said series winding, means for supplying alternating current to said pilot coils, a differential-relay device comprising two distinct and opposed torque elements, means for energizing said torque elements in proportion to the alternating-current flow to said pilot coils determined by the admittances thereof, respectively, said differential relay being arranged to occupy a neutral position when the air-gap flux has the desired value for the corresponding load current, and means whereby, if said load current changes, said differential relay operates to adjust the excitation of said commutating pole to again produce the desired air-gap flux for the new value of the load current.

In testimony whereof I have hereunto subscribed my name this 28th day of Feb. 1918.

CHESTER T. ALLCUTT.